(12) United States Patent
Guo

(10) Patent No.: US 8,941,991 B2
(45) Date of Patent: Jan. 27, 2015

(54) KEYBOARD AND ELECTRONIC DEVICE EMPLOYING THE KEYBOARD

(71) Applicants: Fu Tai Hua Industry (Shenzhen) Co., Ltd., Shenzhen (CN); Hon Hai Precision Industry Co., Ltd., New Taipei (TW)

(72) Inventor: Ji-Bing Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 108 days.

(21) Appl. No.: 13/735,304

(22) Filed: Jan. 7, 2013

(65) Prior Publication Data

US 2013/0182384 A1    Jul. 18, 2013

(30) Foreign Application Priority Data

Jan. 12, 2012   (CN) .......................... 2012 1 0008054

(51) Int. Cl.
*G06F 1/16* (2006.01)
*G06F 3/02* (2006.01)

(52) U.S. Cl.
CPC .............. *G06F 1/1667* (2013.01); *G06F 1/166* (2013.01); *G06F 3/0208* (2013.01)
USPC ............ 361/679.59; 361/679.11; 361/679.12; 361/679.2

(58) Field of Classification Search
CPC ............................... G06F 1/166; G06F 1/1667
USPC ..................................................... 361/679.59
See application file for complete search history.

(56) References Cited

U.S. PATENT DOCUMENTS

| | | | | |
|---|---|---|---|---|
| 7,566,043 | B2 * | 7/2009 | Chen ............................ | 248/616 |
| 2002/0139909 | A1 * | 10/2002 | Oyama et al. .............. | 248/188.8 |
| 2005/0083645 | A1 * | 4/2005 | Moore et al. .................. | 361/683 |
| 2010/0165560 | A1 * | 7/2010 | Zhu et al. ................. | 361/679.12 |

* cited by examiner

*Primary Examiner* — Anthony Q Edwards
(74) *Attorney, Agent, or Firm* — Novak Druce Connolly Bove + Quigg LLP

(57) ABSTRACT

A keyboard includes a cover, a housing, and a main body. The main body is sandwiched between the cover and the housing. The keyboard further includes an adjustment mechanism for supporting the keyboard at an inclination. The adjustment mechanism includes an adjustment portion, a supporting portion corresponding to a first through hole defined in the housing, a driving portion configured to drive the supporting portion to move along a central axis of the first through hole, and a securing portion configured to control the supporting portion to stop moving. When the adjustment portion is operated, the driving portion drives the supporting portion to move along the central axis of the first through hole to support the keyboard at different inclinations. When the adjustment portion is free, the securing portion engages with the supporting portion, and the keyboard holds the selected inclination.

20 Claims, 8 Drawing Sheets

KEYBOARD AND ELECTRONIC DEVICE EMPLOYING THE KEYBOARD

BACKGROUND

1. Technical Field

The present disclosure relates to a keyboard and an electronic device employing the keyboard.

2. Description of Related Art

Keyboard is a basic input device for electronic devices such as personal computers or notebooks. Most keyboards can be maintained at a certain angle with a support apparatus. However, many current keyboards can only be held in one position, and cannot be adjusted to different angles.

Therefore, a keyboard to overcome the above described shortcoming is desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments in detail.

Figure 1:
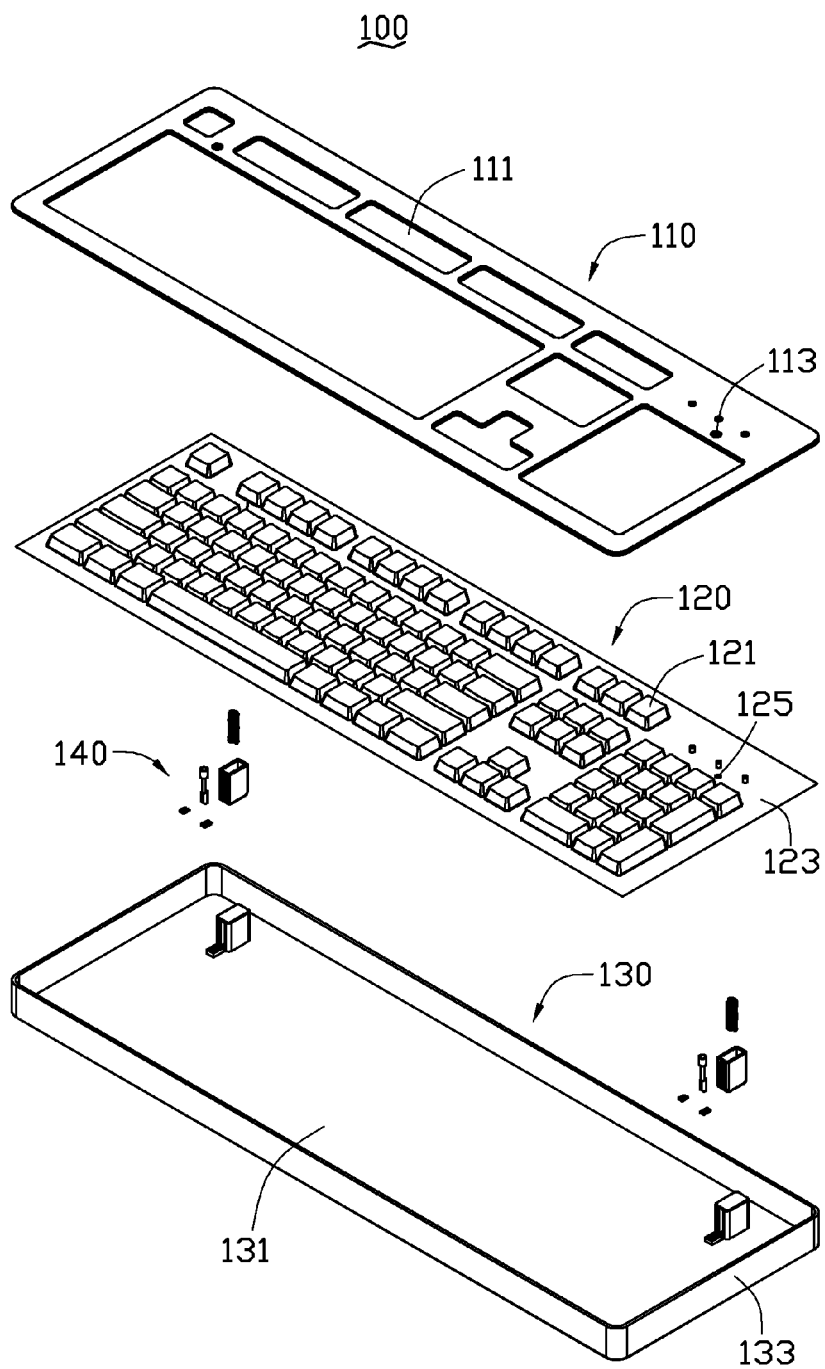
FIG. 1 is an exploded view of a keyboard according to one embodiment.
Figure 4:
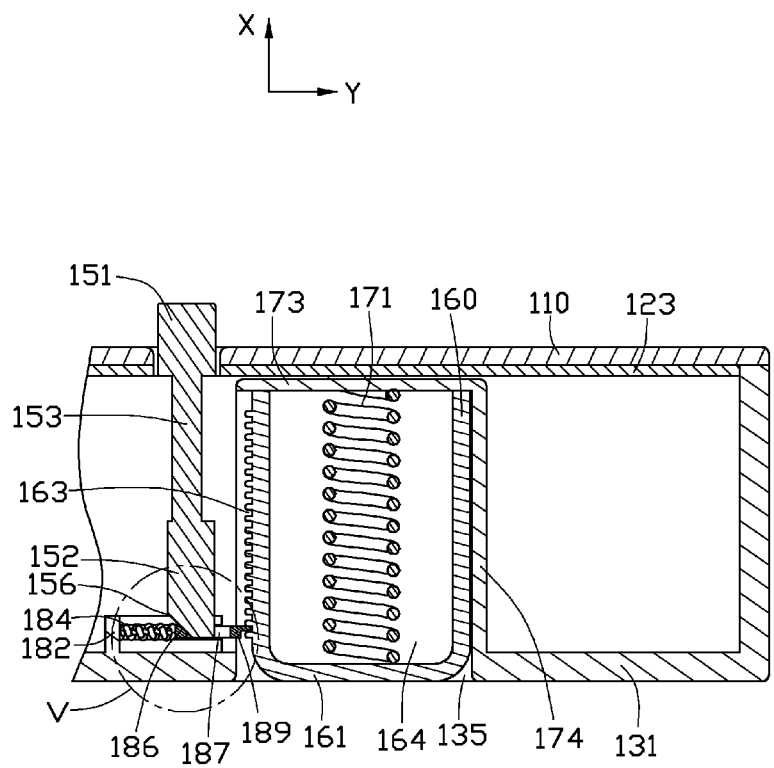
FIG. 4 is a sectional view of FIG. 3 along line III-III.

FIG. 1 shows a keyboard 100 of one embodiment. The keyboard 100 includes a cover 110, a housing 130, and a main body 120. The housing 130 and the cover 110 define a space for receiving the main body 120. The main body 120 is sandwiched between the cover 110 and the housing 130. The main body 120 includes a plurality of keys 121 and a printed circuit board (PCB) 123 arranged under the keys 121. The cover 110 defines a plurality of openings 111 to expose the keys 121 through the cover 110. The housing 130 includes a bottom board 131 and side walls 133 extending perpendicularly from edges of the bottom board 131. The bottom board 131 defines a first through hole 135 as shown in FIG. 4. The cover 110 defines a second through hole 113 corresponding to the first through hole 135. The PCB 123 also defines a third through hole 125 corresponding to the first through hole 135 and the second through hole 113.

The keyboard 100 further includes an adjustment mechanism 140 to adjust an inclined angle of the keyboard 100. The adjustment mechanism 140 is arranged between the cover 110 and the housing 130. The adjustment mechanism 140 is fixed in the first through hole 135, the second through hole 113, and the third through hole 125. Two ends of the adjustment mechanism 140 are exposed from the keyboard 100 via the first through hole 135 and the second through hole 113, correspondingly. In the embodiment, the keyboard 100 includes two adjustment mechanisms 140 at two opposite sides of the keyboard 100 to balance the keyboard 100.

Figure 2:
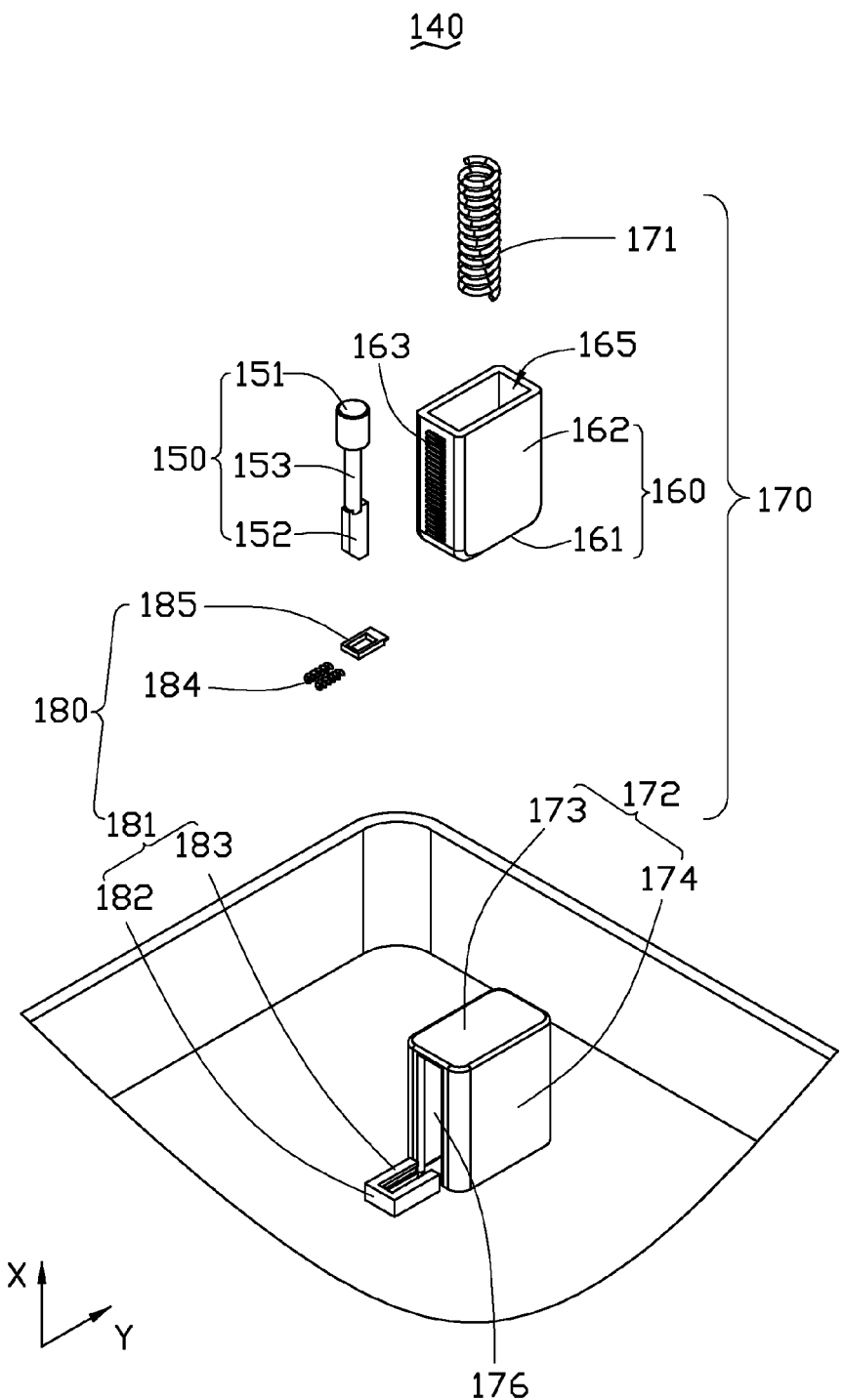
FIG. 2 is an enlarged view of adjustment mechanism of the keyboard of FIG. 1.
Figure 3:
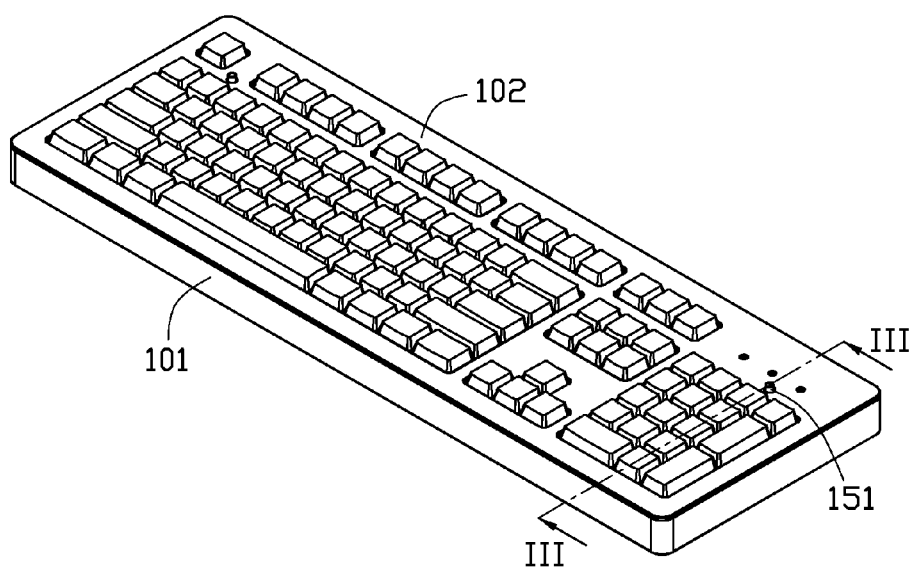
FIG. 3 is an assembled view of the keyboard of FIG. 1.

FIGS. 2-4 show that the adjustment mechanism 140 includes an adjustment portion 150, a supporting portion 160, a driving portion 170, and a securing portion 180. A user operates the adjustment portion 150 to adjust the inclined angle of the keyboard 120. The supporting portion 160 can protrude out from the bottom board 131 via the first through hole 135 to support the keyboard 100 at different inclinations on a supporting surface. The driving portion 170 drives the supporting portion 160 to move along a central axis of the first through hole 135 in a first direction X. The securing portion 180 resists the side of the supporting portion 160 to fasten the supporting portion 160 when the supporting portion 160 supports the keyboard 100.

The supporting portion 160 includes a bottom plate 161 and a plurality of first side walls 162 extending perpendicularly from the bottom plate 161. The supporting portion 160 is a hollow pillar and defines a first rectangular opening 165 opposite to the bottom plate 161. One of the first side walls 162 includes a rack 163. In the embodiment, the bottom plate 161 and a plurality of first side walls 162 define a first receiving space 164.

Figure 6:
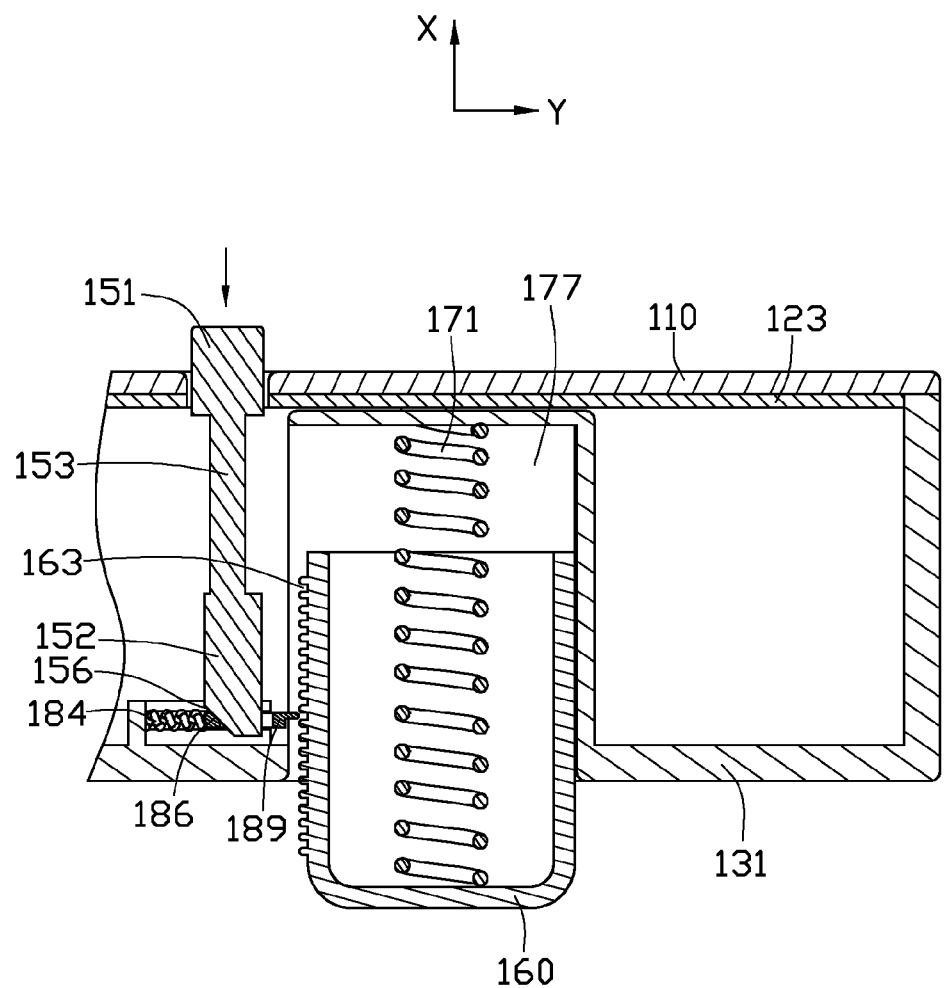
FIG. 6 is similar to a view of part of the keyboard of FIG. 4, but showing the adjustment mechanism adjusts inclined angle of the keyboard of FIG. 1.

The driving portion 170 includes a first elastic member 171 and a position unit 172. The position unit 172 extends from the bottom board 131 and surrounds the first through hole 135. The position unit 172 includes an upper plate 173 and a plurality of second side walls 174 extended from the bottom board 131 surrounding the first through hole 135. The position unit 172 defines a second receiving space 177 as shown in FIG. 6 to movably receive the supporting portion 160. The shape of the second receiving space 177 mates the supporting portion 160. The second receiving space 177 defines a second opening 176 to expose the rack 163 of the supporting portion 160. One end of the first elastic member 171 is received in the first receiving space 164 and resists the bottom plate 161. The other end of the first elastic member 171 is received in the second receiving space 177 when the supporting portion 160 is also received in the second receiving space 177. Under this condition, the first elastic member 171 is arranged between the upper plate 173 of the position unit 172 and the bottom plate 161 of the supporting portion 160 to drive the supporting portion 160 to move along the first direction X. In the embodiment, the first elastic member 171 is a spring.

The securing portion 180 arranged around the first through hole 135 on the bottom board 131. The securing portion 180 includes a fixing unit 181, a second elastic member 184, and a stopping unit 185. The fixing unit 181 is fixed to the bottom board 131 adjacent to the second opening 176. The fixing unit 181 includes a position wall 182 and two guide walls 183. The position wall 182 extends from the bottom board 131 towards the cover 110. One end of each guide wall 183 connects with the position wall 182, and other end of each guide wall 183 is near the second opening 176. The position wall 182 and the two guide walls 183 define a U-shaped groove. An opening of the U-shaped groove aligns with the second opening 176.

The second elastic member 184 is sandwiched between the fixing unit 181 and the stopping unit 185. The stopping unit 185 is driven by second elastic member 184 to move along the two guide walls 183 in the second direction Y perpendicular to the first direction X. Thus, the stopping unit 185 may engage with the rack 163.

Figure 5:
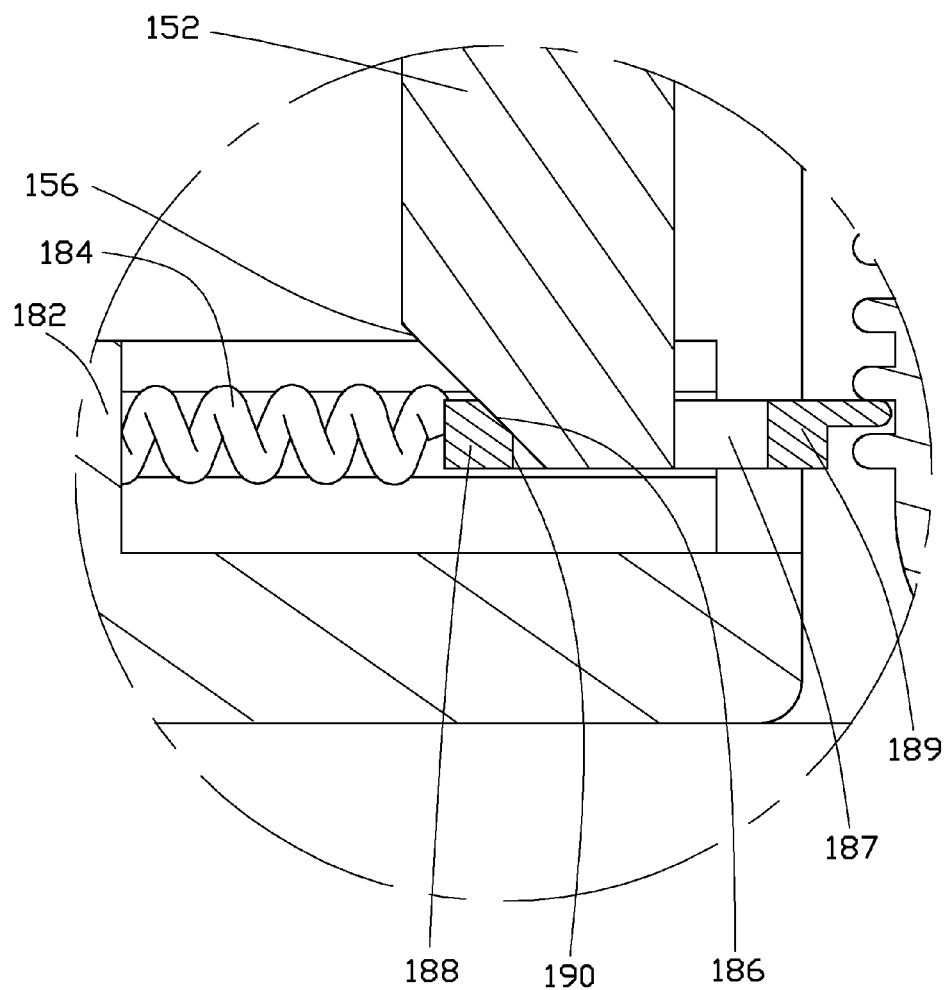
FIG. 5 is an enlarged view of a circled part V of FIG. 4.

FIG. 5 shows that the second elastic member 184 includes two second springs. The stopping unit 185 includes a resisting end 188 and a stopping end 189. The stopping unit 185 defines a fourth through hole 187 between the resisting end 188 and the stopping end 189.

The second elastic member 184 includes two second springs, one end of each second spring is fixed on the position wall 182, and the other end of each spring is fixed on the resisting end 188. The resisting end 188 defines a first inclined surface 186 in an internal sidewall 190 of the fourth through hole 187 opposite to the second spring 184. The first inclined surface 186 extends from a top surface of the resisting end 188 near the second spring 184 to the internal sidewall of the fourth through hole 187 near the second spring 184. The stopping end 189 mates with the rack 163.

The adjustment portion 150 includes a button 151, a connecting bar 153, and an adjustment end 152. The connecting bar 153 connects to the button 151 and the adjustment end 152 with two ends. The adjustment end 152 is used to press the first inclined surface 186 of resisting end 188, thereby driving the stopping unit 185 to move along the second direction Y. The adjustment end 152 defines a second inclined surface 156 corresponding to the first inclined surface 186. Part of the adjustment end 152 is received in the fourth through hole 187. When the button 151 is pressed down as shown in FIG. 6, the adjustment portion 150 moves along the first direction X, and the second inclined surface 156 resists the first inclined surface 186 to drive the stopping unit 185 to move along the second direction Y.

The button 151 protrudes from the cover 110 via the second through hole 113 as shown in FIG. 4. The keyboard 100 defines a first side 101 and a second side 102 opposite to the first side 101. The two adjustment mechanisms 140 can adjust the second side 102 that is separated from the supporting surface.

When the keyboard 100 is in a first state as shown in FIG. 4, the supporting portion 160 is received in the second receiving space 177. The button 151 protrudes out of the cover 110 of the keyboard 100. The second inclined surface 156 resists the first inclined surface 186 of the resisting end 188. The stopping end 189 mates with the rack 163. The top of the first side walls 162 resists the upper plate 173. The bottom plate 161 and the upper plate 173 compress the first elastic member 172. The second elastic member 184 is in its natural state.

FIG. 6 shows that the adjustment mechanism 140 during the process of adjusting the incline angle of the keyboard 100. When the button 151 is pressed by the user, the adjustment end 152 moves along the first direction X. As the first inclined surface 186 resists the second inclined surface 156, the stopping unit 185 moves along the second direction Y, thus the stopping end 189 departs from the rack 163 and the second elastic member 184 is compressed. The supporting portion 160 is driven to protrude from the keyboard 100 via the first through hole 135 by the first elastic member 171.

Figure 7:
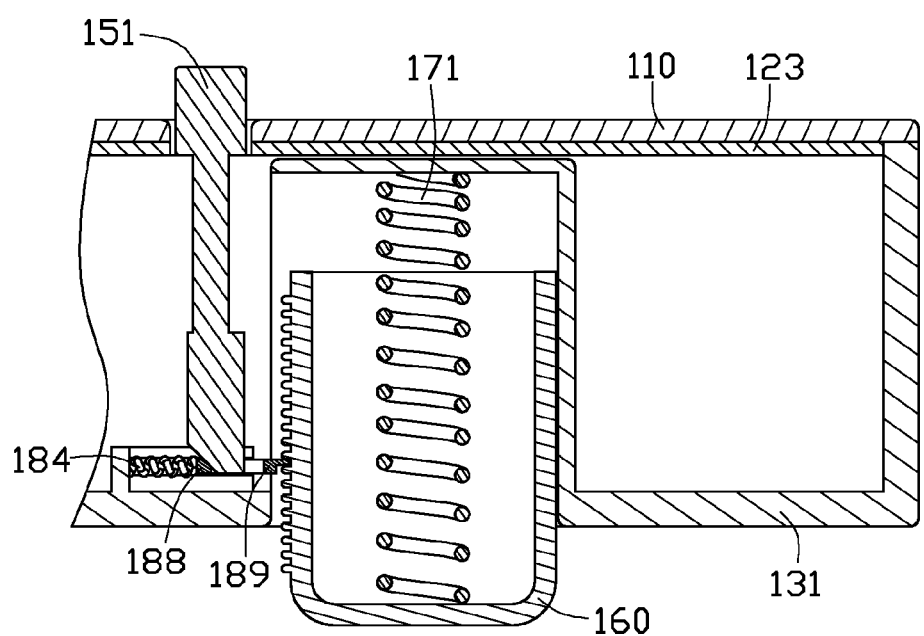
FIG. 7 is similar to a view of part of the keyboard of FIG. 4, but showing the adjustment mechanism after adjusted the inclined angle of the keyboard of FIG. 1.

FIG. 7 shows that the supporting portion 160 supports the keyboard 100 at different inclinations on the supporting surface. When the user releases the button 151, the stopping unit 185 moves to the supporting portion 160 along the second direction Y, the stopping end 189 mates with the rack 163 again to stop the movement of the supporting portion 160.

In summary, the keyboard 100 includes the adjustment mechanism 140 to adjust an exposed length of the supporting portion 160 when the keyboard 100 is placed on a surface, thereby confirming an inclined angle of the keyboard 100, thus the keyboard 100 can keep different inclinations as selected by a user.

Figure 8:
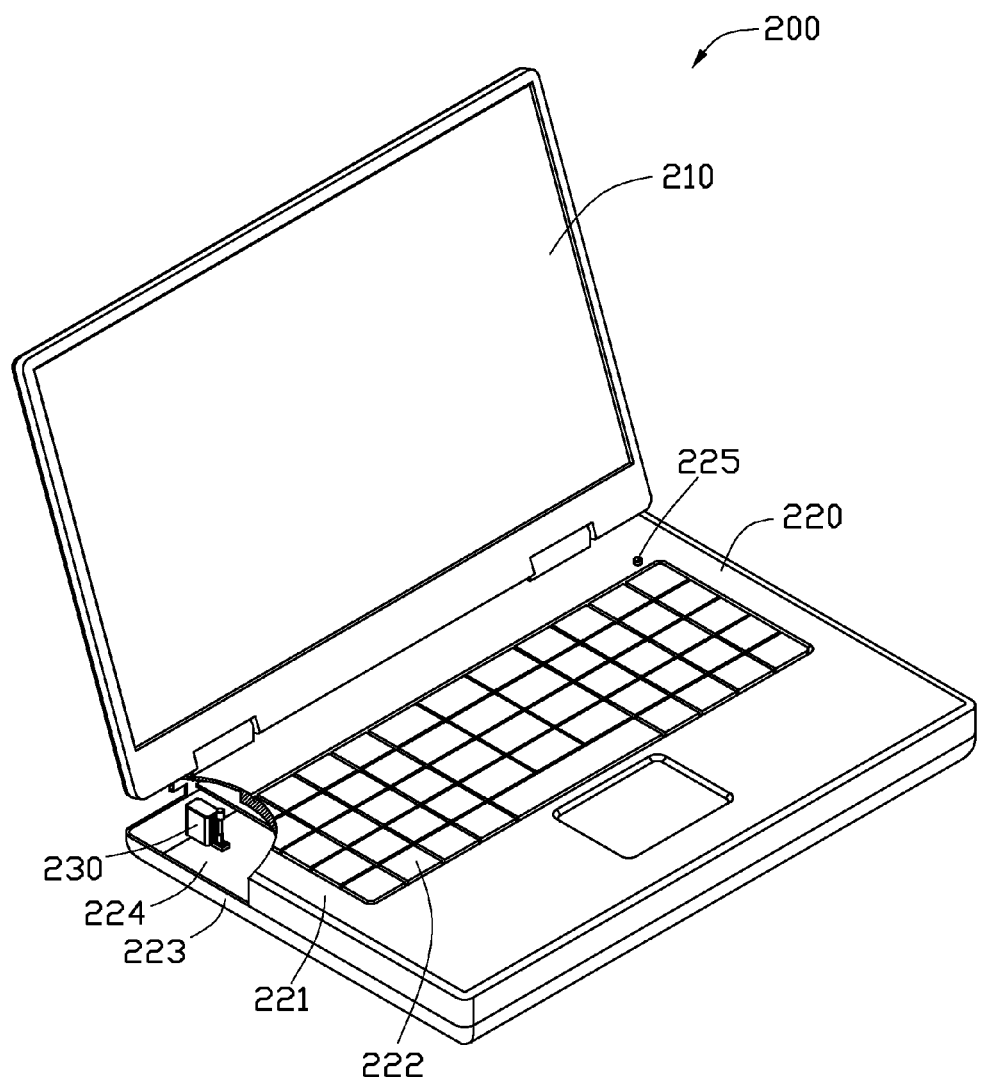
FIG. 8 is an isometric view of an electronic device employed the keyboard of FIG. 1 according to one embodiment.

FIG. 8 shows that an electronic device 200 includes a display 210 and a keyboard 220 pivotably connected to the display 210. In the embodiment, the electronic device 200 is a notebook.

The keyboard 220 is similar to the keyboard 100 shown in FIG. 1. The keyboard 220 includes a cover 221, a housing 223, and main body 222. The main body 222 is sandwiched between the cover 221 and the housing 223. The cover 221 defines an opening (not labeled), a plurality of keys are exposed through the cover 221 via the opening. The housing 223 includes a bottom board 224 for loading the main body 222. The bottom board 224 defines a first through hole (not labeled), and the cover 221 defines a second through hole corresponding to the first through hole.

The keyboard 220 further includes an adjustment mechanism 230 to adjust inclined angle of the keyboard 220. The adjustment mechanism 230 is arranged between the cover 221 and the housing 223. The adjustment mechanism 230 is fixed in the first through hole and the second through hole. Two ends of the adjustment mechanism 230 are exposed from the keyboard 220 via the first through hole and the second through hole, correspondingly. In the embodiment, the keyboard 220 includes two adjustment mechanisms 230 at two opposite sides of the keyboard 220 to balance the electronic device 200. The structure and operating manner of the adjustment mechanism 230 is similar to the adjustment mechanism 140.

It is to be understood that even though numerous characteristics and advantages of the present embodiments have been set forth in the foregoing description, together with details of the structures and functions of the embodiments, the disclosure is illustrative only; and changes may be in detail, especially in the matters of shape, size and arrangement of parts within the principles of the embodiments to the full extent indicated by the broad general meaning of the terms in which the appended claims are expressed.

What is claimed is:

1. A keyboard, comprising:
a main body sandwiched between a cover and a housing, the main body comprising a plurality of keys exposed through the cover via a plurality of openings, and
an adjustment mechanism, comprising:
a supporting portion exposed from the housing via a first through hole defined in the housing to support the keyboard at a selected inclination on a supporting surface;
an adjustment portion protruding out of the cover via a second through hole defined in the cover;
a driving portion for driving the supporting portion to move along a central axis of the first through hole in a first direction; and
a securing portion for controlling the supporting portion to stop moving;
wherein when the adjustment portion is operated, the driving portion drives the supporting portion to move along the first direction to support the keyboard at the selected one of different inclinations, when the adjustment portion is free, the securing portion controls the supporting portion to stop moving, and the keyboard keeps the selected inclination.

2. The keyboard of claim 1, wherein the driving portion comprises a position unit and a first elastic member, the position unit is a protrusion extended from a bottom board of the housing, the first elastic member is arranged between the position unit and the supporting portion and configured to drive the supporting portion to move along the central axis of the first through hole to support the keyboard at different inclinations.

3. The keyboard of claim 2, wherein the supporting portion comprises a bottom plate and a plurality of first side walls extending perpendicularly from the bottom plate, the bottom plate and the plurality of first side walls define a first receiving space, one end of the first elastic member is fixed on the bottom plate, and other end of the first elastic member is fixed in the position unit.

4. The keyboard of claim 3, wherein the position unit comprises an upper plate and a plurality of second side walls extended from the bottom board, the upper plate and the plurality of second side walls define a second receiving space to receive the supporting portion and a first opening, the first elastic member is arranged between the upper plate of the position unit and the bottom plate of the supporting portion to drive the supporting portion move along the first direction.

5. The keyboard of claim 4, wherein the supporting portion further comprises a rack on one of first side walls exposed from the first opening.

6. The keyboard of claim 5, wherein the securing portion comprises a fixing unit, a second elastic member, and a stopping unit; the fixing unit is fixed in the bottom board adjacent to the first opening, the second elastic member is sandwiched between the fixing unit and the stopping unit, the second elastic member drives the stopping unit to move along a second direction perpendicular to the first direction to engage with the rack.

7. The keyboard of claim 6, wherein the second elastic member comprises two second springs, one end of each second spring is fixed on the fixing unit, and other end of each spring is fixed on the stopping unit.

8. The keyboard of claim 6, wherein the fixing unit comprises a position wall and two guide walls, the position wall extends from the bottom board of the housing, the position wall and the two guide walls form a U-shaped groove, the two guide walls are configured to guide the stopping unit to move along the second direction.

9. The keyboard of claim 6, wherein the stopping unit comprises a resisting end and a stopping end, the stopping end mates with the rack; the stopping end is configured to drive the stopping unit to move along the second direction to separate from the rack when the adjustment portion is pressed.

10. The keyboard of claim 9, wherein the adjustment portion comprises a button, a connecting bar, and an adjustment end; the connecting bar connects to the button and the adjustment end; when the button is pressed, the stopping unit separates from the rack.

11. The keyboard of claim 10, wherein the resisting end defines a first inclined surface relative to the bottom board, the adjustment end defines a second inclined surface resisting again the first inclined surface; the resisting end drives the stopping end to separate from the rack when the button is pressed.

12. An electronic device, comprising:
a display pivotably connected to a keyboard, the keyboard comprising:
a main body sandwiched between a cover and a housing;
the main body comprising a plurality of keys exposed through the cover via a plurality of openings; and
an adjustment mechanism, comprising:
a supporting portion exposed from the housing via a first through hole defined in the housing to support the keyboard at a selected inclination on a supporting surface;
an adjustment portion protruding out of the cover via a second through hole defined in the cover;
a driving portion for driving the supporting portion move along a central axis of the first through hole in a first direction; and
a securing portion for controlling the supporting portion to stop moving;
wherein when the adjustment portion is operated, the driving portion drives the supporting portion to move along the first direction to support the electronic device at the selected one of different inclinations, when the adjustment portion is free, the securing portion controls supporting portion to stop moving, and the electronic device keeps the selected inclination.

13. The electronic device of claim 12, wherein the driving portion comprises a position unit and a first elastic member, the position unit is a protrusion extended from a bottom board of the housing, the first elastic member is arranged between the position unit and supporting portion and configured to drive the supporting portion to move along the central axis of the first through hole to support the keyboard at different inclinations.

14. The electronic device of claim 13, wherein the supporting portion comprises a bottom plate and a plurality of first side walls extending perpendicularly from the bottom plate, the bottom plate and the plurality of first side walls define a first receiving space, one end of the first elastic member is fixed on the bottom plate, and other end of the first elastic member is fixed in the position unit.

15. The electronic device of claim 14, wherein the position unit comprises an upper plate and a plurality of second side walls extended from the bottom board, the upper plate and the plurality of second side walls define a second receiving space to receive the supporting portion and a first opening, the first elastic member is arranged between the upper plate of the position unit and the bottom plate of the supporting portion to drive the supporting portion move along the first direction.

16. The electronic device of claim 15, wherein the securing portion comprises a fixing unit, a second elastic member, and a stopping unit; the fixing unit is fixed in the bottom board adjacent to the first opening, the second elastic member is sandwiched between the fixing unit and the stopping unit, the second elastic member drives the stopping unit to move along a second direction perpendicular to the first direction to engage with a rack on one of first side walls exposed from the first opening.

17. The electronic device of claim 16, wherein the second elastic member comprises two second springs, one end of each second spring is fixed on the fixing unit, and other end of each spring is fixed on the stopping unit.

18. The electronic device of claim 17, wherein the fixing unit comprises a position wall and two guide walls, the position wall extends from the bottom board of the housing, the position wall and the two guide walls form a U-shaped groove, the two guide walls are configured to guide the stopping unit to move along the second direction.

19. The electronic device of claim 16, wherein the stopping unit comprises a resisting end and a stopping end, the stopping end mates with the rack; the stopping end is configured to drive the stopping unit to move along the second direction to depart the rack when the adjustment portion is pressed.

20. The electronic device of claim 19, wherein the adjustment portion comprises a button, a connecting bar, and an adjustment end; the connecting bar connects to the button and the adjustment end; when the button is pressed, the stopping unit separates from the rack.

* * * * *